June 20, 1944.  G. P. BOHRER  2,351,582
TRANSFER MOLDING PRESS
Filed Aug. 29, 1941  3 Sheets-Sheet 3

Witness:
A. A. Horn

Inventor:
George P. Bohrer
by John R. Hobson
Attorney.

Patented June 20, 1944

2,351,582

UNITED STATES PATENT OFFICE 2,351,582

TRANSFER MOLDING PRESS

George P. Bohrer, Union Township, Union County, N. J., assignor to Shaw Insulator Company, Irvington, N. J., a corporation of New Jersey Application August 29, 1941, Serial No. 408,721

6 Claims. (Cl. 18—30)

This invention relates to transfer molding presses wherein thermosetting resinous materials are subjected to heat and pressure in a loading chamber or pot and delivered therefrom through a narrow passage or passages into a die to form the desired articles. The pressure is applied by means of a piston or force in the loading chamber or pot.

In apparatus of this character the operation may be so performed that in each cycle of operations a quantity of molding material is introduced into the loading chamber which is sufficient to provide and leave an excess or cull in the loading chamber after all cavities and passages are filled. such excess insures that pressure may be maintained from the loading chamber upon the piece being molded until the cure is completed. It is necessary to remove the thermally reacted cull or excess from the press after each molding operation and the piston or force is withdrawn from the loading chamber for this purpose.

The object of the present invention is to provide a transfer molding press embodying novel mechanism for removing the excess or cull material from a transfer molding press after each molding operation.

Most specifically it is an object of the invention to provide novel cull-ejecting means for a transfer molding press so constructed and arranged that when the piston and the cylinder are separated the cull will certainly remain attached to the piston in intact or unbroken condition and then will automatically be detached therefrom for removal from the press.

In order that the invention may be more fully understood and its advantages appreciated reference should be had to the accompanying drawings illustrating an embodiment thereof and in which drawings.

Figure 1:
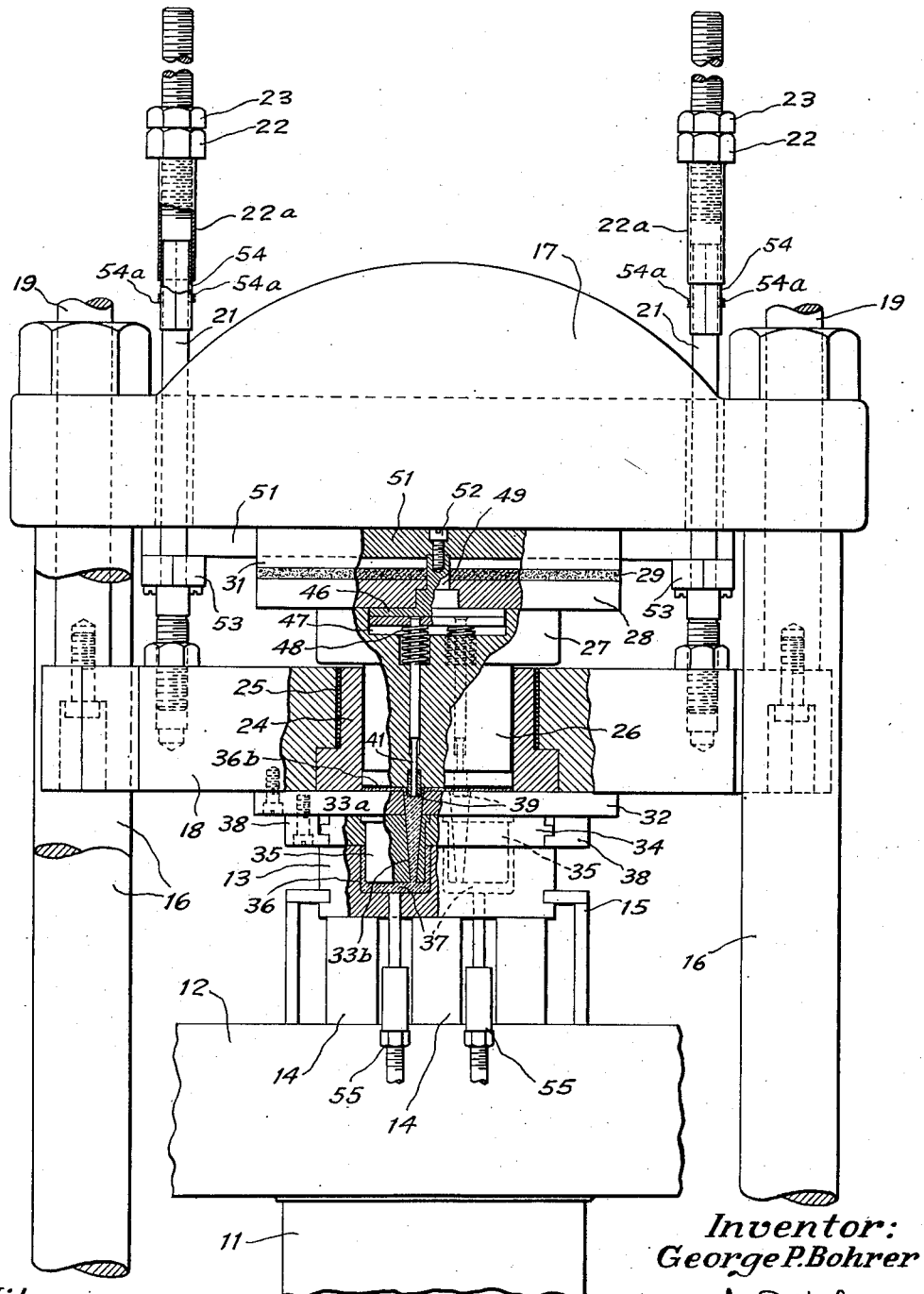
Figure 1 is a view in elevation and vertical section of a transfer molding press in which the invention is incorporated, showing position of the parts of the press at the conclusion of the molding operation but before the press has started to open to eject the molded parts and the cull.

The form of press illustrated in the drawings is an upstroke press with intermediate platen and comprising ram 11 carrying bottom platen 12 on which is supported the lower part 13 of the die which rests on spacer blocks 14 and which is held in position on said blocks by suitable means, as shown at 15.

The ram 11 is operated by suitable fluid pressure control mechanism, not shown, to raise and lower the die portion 13. The strain rods 16 of the press support the head 17 and the intermediate platen 18 is supported for vertical movement beneath the head of the press. The platen 18 has push-back rods 19 connected to the ends thereof as shown, which rods pass upwardly through the press head and enter pushback cylinders (not shown).

Figure 3:
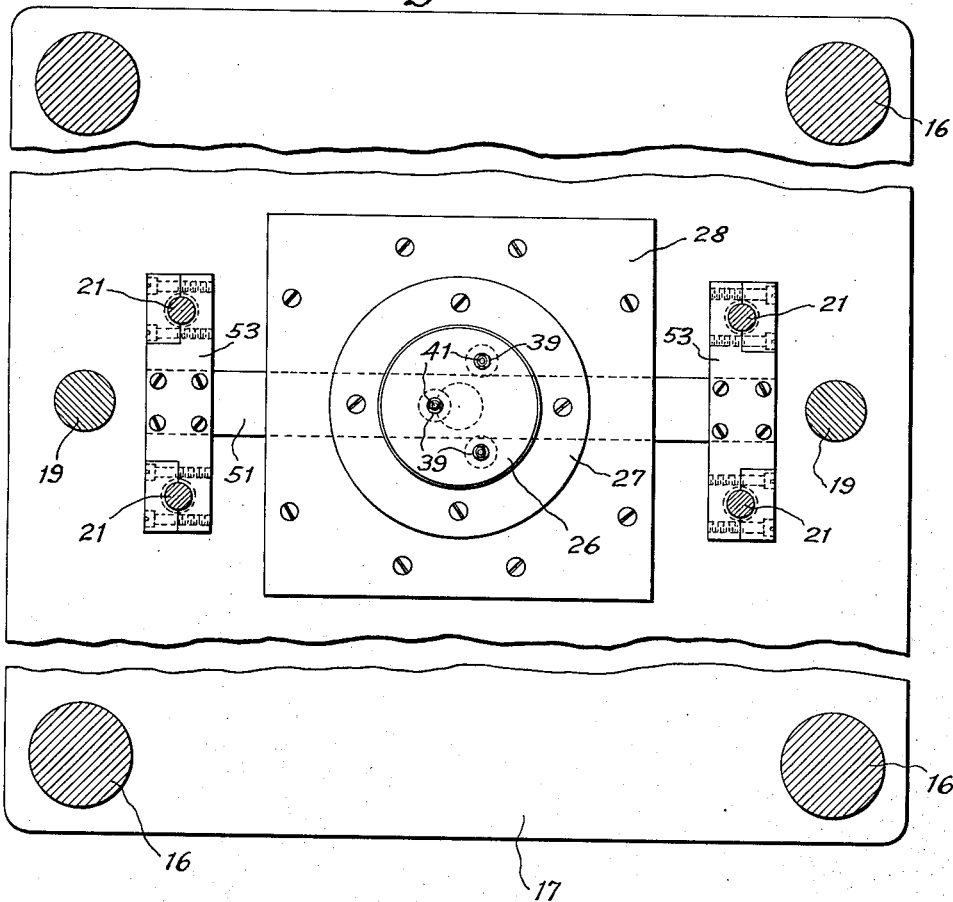
Fig. 3 is a view in sectional plan taken approximately on the line 3—3 of Fig. 2, looking upwardly as indicated by the arrows.

Downward movement of platen 18 is limited by the stop rods 21 having stop nuts 22 and lock nuts 23 threaded thereon, the stop nuts engaging the head of the press to stop the downward movement of the platen. Four such rods are provided as shown in Fig. 3. Nuts 22 have thread protectors 22—a attached thereto.

The intermediate platen 18 contains the pot or cylinder 24 suitably held therein and suitably heated as by means of an electrical resistance heater indicated at 25, for heating the molding compound. The force or piston 26, which operates in the pot, is provided with a top flange 27 secured to a plate 28 separated by insulation 29 on another plate 31, all suitably secured to the head 17 of the press. The insulation 29 prevents the dissipation of heat from the pot through the piston and its supporting structure into the head of the press as would otherwise occur.

Also attached to the platen 18 is a plate 32 which forms the bottom of the pot or loading chamber and in which gates are partly formed, as indicated at 33—a.

Secured to the bottom of the plate 32 is another plate 34 in which are mounted cores 35 cooperating with the cavities 36 of the die part 13 to form hollow articles, as indicated at 37. The plate 34 is secured to the plate 32 by means of the flange members or retainers 38.

It will be understood that the parts which constitute the die structure may be widely varied in shape and design for the purpose of molding articles of various shapes and sizes. It also will be understood that the die may be a single cavity die instead of the three cavity die which is illustrated.

The lower portion 33—b of the gate for each of the die cavities is formed in the core 35.

In order to remove or eject the cull and gate material, plugs 39 are attached to the bottom end of the piston 26 inwardly of the bottom edge to hold the cull and pull the gate or sprue material and to hold the cull on the end of the piston as the press is opened. Each plug has a pin 41 extending therethrough for detaching the cull and sprue material from the piston after the press is opened. Three of such plugs and pins are illustrated but any desired number thereof may be employed. In some operations, one plug and associated pin are sufficient.

Figure 4:
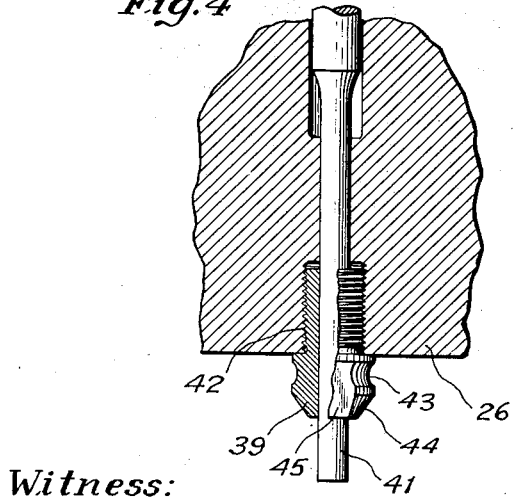
Fig. 4 is an enlarged view of a fragmentary portion of the apparatus illustrating the cull pulling plug and ejecting pin.
Figure 5:
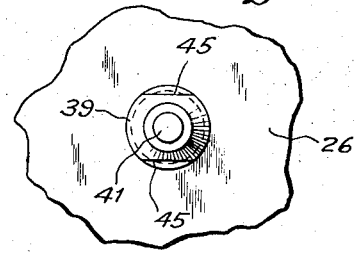
Fig. 5 is a bottom view of the plug and pin of Fig. 4.

As shown in Figs. 4 and 5, each plug 39 has a screw threaded shank 42 by means of which the plug is held in the piston 26 and the plug is shaped to provide a groove or constriction 43 which, being an undercut, results in the firm attachment of the cull to the piston. The lower end of the plug may be tapered, as shown at 44. Each plug may also be provided with flats 45 for screwing the plug into and out of the piston.

The pins 41 are connected at their upper ends to a plate 46 received in a cavity 47 in the upper portion of the piston 26. This plate is yieldingly held in upper position against the plate 28 by compression springs 48 surrounding the pins 41.

As shown in Figs. 1 and 4, the upper portions of the pins may be larger than the lower end portions to afford better bearing surfaces for them. The plate 46 has an upwardly extending boss 49 connected to a cross bar 51 by a screw 52, which cross bar serves to depress the plate 46 against the compression springs 48 to force pins 41 downwardly through their respective plugs 39 to detach the cull from the end of the piston 26.

The operation of the cross bar 51 preferably is effected in response to the movement of the parts or a part of the press to open position and the movement of the intermediate platen into its lower position may be utilized for this purpose. To this end, the cross bar 51 is connected at its outer ends to additional bars 53 slidably mounted on the rods 21 previously referred to. As a result of this arrangement, when the press is opened and the intermediate platen 18 is lowered to its lowermost position for the particular molding operation, the bars or members 53 are engaged by collars 54 on the rods 21 connected to the platen 18, this occurring just as the downward movement of the platen stops. This depresses the cross bar 51 and forces the pins 41 downwardly to detach the cull from the piston 26.

Figure 2:
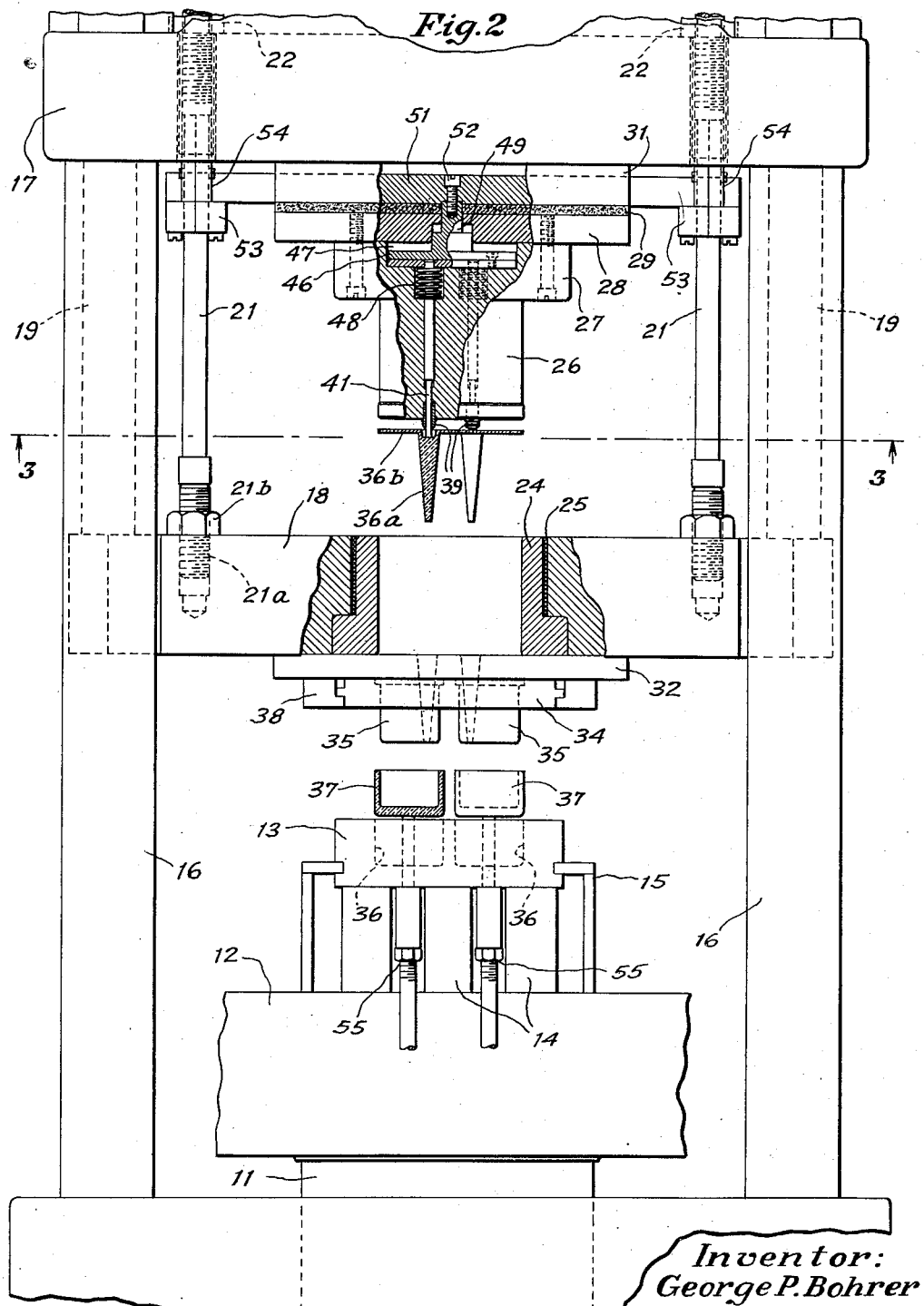
Fig. 2 is a similar view showing the press in open position with the molded articles ejected from the die and the cull being ejected or detached from the press.

Preferably, the cull is detached from piston 26 in the above manner when the pot 24 has moved downwardly sufficiently to be clear of the gate or sprue material with the cull in detached position. Thus, as shown in Fig. 2, the top of pot 24 is slightly lower than the bottom ends of the gate or sprue material shown at 36—a connected to the main part of the cull 36—b which has just been detached from piston 26 by the downward movement of the pins 41. This makes it unnecessary to raise the detached cull from within pot 24 in order to remove it from the press. It also makes it unnecessary to lower ram 11 to the limit of its downward movement to detach the cull when that is not necessary to open the die.

Such operation is obtained for varying lengths of stroke of platen 18 by providing means for adjusting the operating connections of the rods 21 between platen 18 and the cross bar 51. This may be done by forming the collars 54 in halves as shown and securing them on the rods 21 at various positions by means of set screws 54—a. The rods 21 also may be screw threaded into the platen 18, as indicated at 21—a, and held in adjusted position with respect to the platen by means of lock nuts 21—b.

If desired, the split collars 54 may be used for a coarse or large adjustment and the rods 21 screwed into or out of the platen 18 to obtain a fine adjustment for the operation of the bar 51. The press operator catches the cull in his hand as it is detached and removes it although the cull may be removed by a tool or other means, not shown.

To summarize the operation, a charge of thermosetting molding material is placed in the loading cylinder or pot 24 beneath the piston 26 before or after the press is operated to move the ram upwardly to close the die after the die is closed, continued upward movement of ram 11 raises intermediate platen 18 to move the cylinder 24 upwardly around the piston 26. The application of heat to the molding compound by heater 25 causes it to soften and pressure of the ram on the intermediate platen effects relative movement between the pot 24 and piston 26 causing the heat-softened molding compound to flow through each of the gates 33—a, 33—b into the mold cavities. When the mold cavities are filled an excess of material constituting the part 36—b of the cull will be left in the bottom part of the pot 24 as indicated at 36—b, Fig. 1.

The parts of the press are held in closed position until the desired reaction of the molding material has been effected by the application of heat. Although not shown, the die parts may suitably be heated in known manner to bring about this reaction. Reaction will serve not only to harden the molded pieces 36 in the die cavities but will also harden the gate or sprue material 36—a and the main part of the cull 36—b.

Upon completion of the cure, the press is opened. The ram 11 descends to open the die and to move the cylinder or pot 24 off of the piston 26 by lowering platen 18. As the die reaches the end of its opening movement the molded pieces 36 may automatically be ejected by suitable ejecting devices, as shown at 55. These may be of known construction and operated by suitable means not fully shown.

As the piston starts to move out of pot 24 the sprues 36—a will be pulled or broken off the molded pieces 36 at their lowermost ends where they are thinnest. Breakage of, or separation, of the cull material 36—b from piston 26 as a result of this operation is prevented by the firm attachment of the cull to the bottom of the piston 26, made possible by the undercut plugs 39. As shown in the drawings, the plugs 39 are so located on the bottom surface of the piston 26 as to register with the gates 33—a so that each plug extends into the upper portion of the gate material. This is a desirable arrangement because it places the strain of separating the gate material from the molded piece directly on the plug and along the axis of the plug rather than on the thin cull portion 36—b. If desired the plugs may be positioned out of registry with the gates in which case it may be desirable to provide recesses in plate 32 so that the plugs may be made relatively long without unduly increasing the necessary thickness of the main portion 36—b of the cull which it is desired to keep to a minimum. It is preferred, however, to locate the plugs 39 adjacent to if not in actual alignment with the gates to insure that the cull will not be broken by the strain of pulling and breaking off the gate material as might otherwise occur.

Also the pins 41 need not pass through the plugs 39 but it is preferred that they do so because otherwise the material may be broken in detaching it from the piston or force 26. A more certain and positive detachment of the material from piston 26 is obtained when the pin 41 operates through the plug since that centralizes the detaching force with regard to the attachment of the material of the plug, as will be apparent.

The pins 41 are operated to detach the cull from the plugs 39 and hence from piston 26 by engagement of collars 54 with bars 53 which act through bar 51 and boss 49 to project the pins outwardly of the plugs, as explained above. Although the cull will have been thermally reacted prior to this time, it will be just plastic enough to permit the distortion necessary for its removal from the plugs 39.

When the press closes, pins 41 are retracted within plugs 39 by springs 48 when collars 54 move upwardly away from bars 53.

Various changes may be made in the construction and arrangement of parts of the illustrated embodiment of the invention without departing from the scope of the appended claims. The invention may be utilized in various forms of transfer molding presses or machines and is not limited in its application to the upstroke type of press illustrated in the drawings.

Having thus described my invention, what I claim is:

1. A transfer molding press comprising a die, a loading chamber, which loading chamber is formed by a cylinder for charging said die with thermosetting molding material, a piston associated with said cylinder, means for effecting relative movement between the piston and cylinder to discharge thermosetting molding material from said chamber into a die cavity, said cylinder having an opening in the bottom thereof, and means for removing thermally reacted cull from said press comprising a cull-pulling member projecting from the bottom of said piston and located inwardly of the bottom edge of said piston, for securing the cull to said piston inwardly of the edge of said cull, said member being small enough to extend into said opening in the bottom of said cylinder, and means for detaching said cull from said cull-pulling member and from said piston.

2. A transfer molding press comprising a die, a loading chamber for charging said die with thermosetting molding material, said loading chamber being formed by a cylinder and having a piston associated therewith, means for effecting relative movement between said cylinder and piston to charge said die, said cylinder having an opening in the bottom thereof, and means for removing thermally reacted cull from within said chamber comprising an undercut, inwardly grooved plug attached to the bottom of said piston inwardly of the bottom edge thereof, said plug being small enough to enter said opening in the bottom of said cylinder, a pin associated with said plug, and automatic means for operating said pin to detach said cull from said plug and from said piston.

3. A transfer molding press comprising a die, a loading chamber for charging said die with thermosetting molding material, said chamber being formed by a cylinder and having a piston associated therewith, means for effecting relative movement between said cylinder and piston, a gate leading from said chamber into said die, and means for removing thermally reacted cull material from said chamber and from said gate comprising a cull-pulling plug on and located inwardly of the bottom of said piston and in alignment with said gate for connecting the said thermally reacted cull to said piston inwardly of the edge of said cull and for maintaining such connection during relative separating movement of the cylinder and piston in which the cull is withdrawn from within said chamber, said plug being small enough to enter said gate, a pin mounted in said piston for detaching the thermally reacted cull from said plug and from said piston, and means for operating said pin to detach the cull from the piston upon withdrawal of the reacted material from said gate and from within said loading chamber.

4. A transfer molding press comprising a die, a loading chamber formed by a cylinder and a piston associated with said cylinder for charging said die with thermosetting molding material, an opening in the bottom of said cylinder, and cull-pulling means comprising a plug on and located inwardly of the edge of the bottom of said piston for attaching cull to said piston, said plug being small enough to enter said opening in the bottom of said cylinder, a pin mounted for sliding movement through said plug, and means for projecting said pin outwardly of said plug to detach cull from said plug and from said piston.

5. A transfer molding press comprising a die, a loading chamber formed by a cylinder and a piston associated with said cylinder for charging said die with thermosetting molding material, a gate leading from the loading chamber into the die in which gate material is formed, and cull-pulling means comprising a grooved plug on the bottom of said piston in axial alignment with said gate in position to extend into said gate whereby the material formed in said gate is attached to said plug, said plug being small enough to enter said gate, a pin mounted for sliding movement through said plug, and means for projecting said pin outwardly of said plug to detach cull from said plug and from said piston.

6. A transfer molding press comprising a die in which pieces are molded, a loading chamber formed by a cylinder and a piston associated with said cylinder for charging said die with thermosetting molding material, a plurality of gates leading from the loading chamber into the die in which gates gate material is formed, and cull-pulling means comprising a plurality of plugs on and located inwardly of the edge of the bottom of said piston in axial alignment with said gates and which plugs are small enough to extend into said gates whereby the gate material formed in said gates and cull connected to said material are attached to said plugs to place the strain of separating the gate material and cull from the molded pieces directly on said plugs, and means for detaching cull formed in said cylinder and said gate material from the bottom of said piston and from said plugs.

GEORGE P. BOHRER.